United States Patent [19]
Hewitt

[11] 3,887,506
[45] June 3, 1975

[54] PROCESS OF STABILIZING SOIL AND SOIL ADDITIVE PRODUCT
[75] Inventor: Robert L. Hewitt, Atlanta, Ga.
[73] Assignee: Terra Perma, Inc., Atlanta, Ga.
[22] Filed: Oct. 11, 1973
[21] Appl. No.: 405,484

[52] U.S. Cl. ... 260/17 A; 260/28.5 R; 260/29.6 NR; 260/29.6 WA; 404/75
[51] Int. Cl. ............................................. C08f 45/52
[58] Field of Search .... 260/29.6 WA, 28.5 R, 17 A, 260/29.6 NR

[56] References Cited
UNITED STATES PATENTS

| | | | |
|---|---|---|---|
| 2,809,945 | 10/1957 | Wright | 260/17 A |
| 2,850,468 | 9/1958 | Giggey | 260/29.6 WA |
| 3,003,979 | 10/1961 | Ptasienski | 260/29.6 WA |
| 3,094,500 | 6/1963 | Herman | 260/29.6 WA |
| 3,197,429 | 7/1965 | Baatz | 260/29.6 WA |
| 3,213,051 | 10/1965 | Pink | 260/29.6 WA |
| 3,303,147 | 2/1967 | Elden | 260/29.6 WA |
| 3,505,264 | 4/1970 | Thoese | 260/29.6 WA |
| 3,563,851 | 2/1971 | Armour | 260/29.6 WA |

Primary Examiner—Joseph L. Schofer
Assistant Examiner—P. R. Michl
Attorney, Agent, or Firm—Newton, Hopkins & Ormsby

[57] ABSTRACT

A soil additive comprising a vinyl acetate homopolymer emulsion which includes vinyl acetate, hydroxyethyl cellulose, a non-atonic ethoxylated surfactant, potassium persulfate, sodium bicarbonate and water; a polyvinyl alcohol mixture which includes water, hydrogen peroxide, glycerin and polyvinyl alcohol; and a water repellent emulsion which comprises paraffin wax, an ethoxylated surfactant, diglycol stearate, candelilla wax, stearic acid, water, zirconium acetate, and ethylene urea resin. A process of injecting the additive into the soil is disclosed.

1 Claim, No Drawings

PROCESS OF STABILIZING SOIL AND SOIL ADDITIVE PRODUCT

BACKGROUND OF THE INVENTION

The present invention relates to a soil additive which alters the soil's density and water permeability.

Heretofore, soil stabilization methods using cement had certain drawbacks: for example, the cement particles were subjected to a filtration action in the ground, therefore giving inferior permeability into the minute interstices of the soil. This, of course, restricted the scope in which a product of this type could be used.

Later, chemical soil stabilizing processes were developed using monomers, solutions of urea, formaldahyde resins and other additives; however, these types of systems required polymerization in the soil by the addition of curing agents. These products and methods have not been satisfactory because the chemicals injected into the soil are not uniform and therefore the results were not reproducible.

There are a number of prior art patents in which are found various fomulations for different types of agents which may be added to the soil. The patent to Hedrick et al., U.S. Pat. No. 2,652,379, discloses a soil additive which loosens tightly compacted soils and comprises a partially hydrolyzed polyvinyl ester such as polyvinyl acetate - polyvinyl alcohol. The polymer may be applied to the soil in the presence of a solvent or extender such as water or a solid carrier such as peat moss, limestone, sand, clay, mineral fertilizer, silage or some other fertilizer.

French Pat. No 1,232,237, issued to Karata, discloses a soil additive which is an emulsion of polyvinyl acetate as the principal component of a polyvinyl acetate polymer which contains polyvinyl alcohol which is derived by the partial saponification of polyvinyl acetate.

The patent of Routson, U.S. Pat. No. 3,520,141, discloses a composition useful in rendering soils less permeable to the passage of water and which consists of polyvalent metal ions and certain polymers which include anionic and nonionic water-soluble polymers. Water dispersible latex polymers include homo and copolymers of vinyl acetate, methyl or ethyl methacrylate, and the like.

The patent to Deming, U.S. Pat. No. 3,016,713, shows a composition which prevents infiltration of porous soil surfaces by water from conduits or reservoirs and which consists of a lattice clay such as bentonite, montmorillonite, hectorite, saponite or the like and an anionic polyelectrolyte such as a copolymer of an unsaturated carboxylic acid and vinyl acetate, vinyl formate, vinyl alkyl ether or the like.

The Sakata et at., patent, U.S. Pat. No. 3,495,412, discloses a process for forming a gel-like material in a soil by injecting into the soil an aqueous solution comprising urea, formaldehyde and poylvinyl alcohol and thereafter curing the solution with an acidic solution. The additive renders the soil water impermeable.

BRIEF SUMMARY OF THE INVENTION

The present invention is a stabilizing agent which is mixed with native soil in proportions and to a depth indicated by laboratory tests. Classification and Proctor tests are made to determine the grain, organic content and percentage of natural mositure present in the soil. These tests confirm the amount of the product to be added, check the cure cycle time, optimum soil content and precise mix measurements. Compaction requirements are also lab tested.

The additive includes a polymer, a water repellent, cross-linking agents and plasticizers and more specifically, comprises:

1. 80 – 90% by volume of a vinyl acetate homopolymer emulsion composed of vinyl acetate, hydroxyethyl cellulose, a non-ionic ethoxylated surfactant, potassium persulfate, sodium bicarbonate and water;
2. 5 – 10% by volume of a polyvinyl alcohol mix composed of polyvinyl alcohol, hydrogen peroxide, glycerine and water; and
3. 5 – 10% by volume of a water repellent emulsion composed of paraffin wax, an ethoxylated surfactant, diglycol stearate, candelilla wax, stearic acid, zirconium acetate, ethylene urea resin and water.

All three ingredients are combined in measured amounts and mixed thoroughly together before injection into a given soil. Creation of the stabilized, treated soil (the soil particles having been bound together by the additive) is obtained by natural air curing process. The elimination of additional curing agents once the premeasured amount of additive has been injected into the soil, eliminates the possibility of errors and more uniform curing can be obtained.

DETAILED DESCRIPTION OF THE INVENTION

The following is an example of the composition of the soil additive:

1. Vinyl Acetate Homopolymer Emulsion

| | % By Weight |
|---|---|
| Vinyl Acetate | 55.00 |
| Water | 42.75 |
| Hydroxyethyl cellulose | 2.00 |
| Non-ionic ethoxylated surfactant | 0.05 |
| Potassium persulfate | 0.05 |
| Sodium Bicarbonate | 0.15 |
| | 100.00 |

Procedure

1. Charge the hydroxyethyl cellulose, surfactant and water in a reaction flask and heat by means of a water bath at 80°C. Maintain heat one hour and cool to 30°C.
2. Add the potassium persulfate, sodium bicarbonate and 10% by weight of the total vinyl acetate monomer.
3. Heat the reaction mixture to 70°C. – 75°C. (vinyl acetate - water azeotropes at 66°C. – 68°C.). At this temperature, start a delayed addition of the remaining 90% vinyl acetate monomer through a graduated dropping funnel. Add at a uniform rate, maintaining an 80° + 2°C. temperature, throughout a 3 – 4 hour addition period.
4. At the end of the monomer addition, hold for 15 – 30 minutes and then heat the reaction to 90°C. – 92°C. Retain at this temperature. Filter the finished emulsion through cheesecloth.

| Average Physical Properties | |
|---|---|
| Brookfield Viscosity No. 3 spindle, 30 rpm | 3320 cps |
| Percent solids (observed) | 54.3 |
| Ph | 5.0 |

2. Polyvinyl Alcohol Mix

-Continued

| | % by Weight |
|---|---|
| Water | 63.0 |
| Hydrogen Peroxide | 2.0 |
| Glycerine | 2.0 |

The above ingredients are allowed to stir until well mixed. Then, 33% by weight of the total mixture of polyvinyl alcohol is added with high speed mixing at room temperature. This mixture is heated with stirring at 90°C. – 95°C. until it is clear and free of lumps. Usually, the stirring takes about 1 hour.

3. Water Repellent Emulsion

In an alloy kettle, melt at 85°C. – 90°C.

| | % by Weight |
|---|---|
| Paraffin wax | 17.00 |
| 10-mole ethoxylated surfactant | 2.30 |
| Diglycol stearate | 1.00 |
| Candelilla wax | 5.10 |
| Stearic acid | 2.55 |
| After the above mix has completely melted, add slowly pre-heated water at 80°C. – 85°C. | |
| Water (Gallons) | 51.10 |
| After all the water is added and a uniform mix is obtained, add: | |
| Zirconium acetate (22% solution) | 5.95 |
| Cut off the heat. Do not whip in air, but allow to cool while stirring at 45°C. – 50°C. add: | |
| Ethylene urea resin | 15.00 |
| Cool and draw the emulsion. | |

As the final step, 80 – 90% by volume of the vinyl acetate homopolymer emulsion, 5 – 10% by volume of the polyvinyl alcohol mix and 5 – 10% by volume of the water repellent emulsion are mixed together in a Ribbon Blender until a uniform blend is obtained. The final product can then be packaged in lined drums or stainless steel tanks to prevent rusting.

The finished product has a balanced composition to give the best performance with varied grain size, soil and aggregate compositions for optimum resistance to water of the treated material. It may be used in the construction of roadways, parking lots, aircraft runways, heliports, outdoor storage plarforms, tennis courts, athletic tracks and other surfaces requiring stabilization and solidification. It has demonstrated that it will solidify most classifications of soils as listed by the U.S. National Cooperative Soil Survey and is also used as a complete substitute for hot asphalt aggregate. The latter operation may be done in an on-site mixer or at a base pugmill plant.

The required stabilization and resistance to total pound loads and water is obtained by varied percentages of the product injected into the soil or aggregate determined by prior specifications designated in laboratory tests conducted on the soil or aggregate samples obtained from actual sites. To determine how much of the soil additive can be added to the soil, the moisture-density relations of the soil should be determined by the Soil Proctor Test, according to ASTM D 698-70. In this manner, the optimum moisture content of the soil per volume of soil can be determined, thereby allowing calculation of the amount of soil additive and water which can be injected into the soil.

In conducting laboratory strength value test on the soil specimens, test procedure ASTN D 1559-71 is followed. First, a mixture of the soil, water and the additive is made in a mixing bowl. Next, compaction of the specimen is accomplished by cleaning the specimen mold (4 inch diameter) and the face of the hammer (10 lbs, sliding weight with a free fall of 18 inches). Place the entire batch in the mold and spade the mixture vigorously with a trowel 15 times around the perimeter and 10 times over the interior. Remove the collar and smooth the surface of the mix with a trowel to a slightly rounded shape. Replace the collar. Place the mold on the compaction pedestal in the mold holder, and apply 50 blows with the compaction hammer. Remove the base plate and collar and reverse and reassemble the mold. Apply the same number of blows to the face of the reversed specimen. Carefully extrude the specimen out of the mold, and allow it to stand overnight at room temperature.

Approximately after six days of air curing, unless otherwise specified, immerse the specimen in water and allow it to soak four hours. Then remove the specimen from the water bath, place the specimen between both segments of the breaking head, and place the complete assembly in position on the Marshall testing apparatus. Apply the load to the specimen by means of the constant rate (2 inch - 50.8 mm/min.) until the maximum is reached as indicated by the dial gauge. Then calculate maximum load in lbs. or kg. and include correction when required.

EXAMPLE I

A sample of soil was obtained from a roadbed in the Newton County, Georgia area. The gredation of sample was 95% passing through a No. 4 sieve, having a maximum dry density of 110.1 pcf (1764. kg/m$^3$), a natural moisture content of 17.6% and an optimum moisture content of 16.8%. The soil was classified as red-brown, slightly micaceous, silty fine to coarse, very sandy clay with some ⅜ inch rock fragments.

Material content and strength values for various additive proportions by using soil material compacted at 100 g. of Standard Proctor No. 2 are as follows in Table I.

The additive was then utilized to convert the road into a dust-free hand surfaced street. The above tests indicated the porportions and depth into the native soil the additive had to be mixed. A Galion motor grader scarified the roadbed to a depth of 6 inches. Next, a Rex Stabilizer reduced the soil to a fine, uniform consistency.

A water truck loaded with the additive and water, mixed nine to one as indicated by the lab tests, wetted the prepared soil at a present flow rate. The stabilizer then made another pass to thoroughly mix the soil and the applied waterstabilizer mixture. The roadbed was then completed by compacting with a vibratory roller.

Test cores were taken of the treated roadbed periodically for 15 days to verify solidification. These tests indicated strengths ranging from 310 to 570 psi, with 520 psi average. Normal traffic use was possible five to eight days after installation.

EXAMPLE II

Stability tests were run on specimens of aggregate mix and the present invention, the aggregate having the following mix composite:

Coarse aggregate

| | |
|---|---|
| Stone, No. 5C | — 400 grains |
| Stone, No. 7 | — 400 grains |

Fine Aggregate

Manufactured sand, No. 4 and No. 200 - 400 grains.

72 cc (6% of the dry weight of the mix composite) of the soil additive was mixed into the aggregate. Six Marshall patties, each patty having 1,200 grains, dry weight of the total mix, were molded, soaked in water for 15 hours and then tested. (See Table II)

EXAMPLE III

An asphalt binder aggregate was prepared, having a coarse aggregate of Stone No. 57 (300 grains) and Stone No. 7 (300 grains) and a fine aggregate having a sieve site No. 4 - No. 200 (600 grains). 73 cc (6% of the dry weight of the mix) of the soil additive was added. The mix composite was molded into a Marshall patty. (See Table III)

A general method of injecting the present invention into a roadbed is as follows:

Grade the road to get rid of all corrugations and pot holes and to loosen the road surface material to depth penetration. Remove all large rocks that would cause equipment failure or breakage when using a single or multi pass stabilizer. Since rapid drainage is important to the soil additive, it is recommended that an "A" type crown modified cross section with a uniform center line and side slopes of one-half inch per foot from the center line to the edge of the road be utilized. A moisture test must be made on site at time of installation to determine the dilution factor of the product.

The best method of installation is to use a multi or single stabilizer processed by a water tank with the mixed soil additive feed back to the pulverizer under pressure and regulated to the gallons per minute to the square yard or meter to bring the soil to optimum, as per the design specifications. If preferred, the diluted additive can be installed in one-half or one-third amounts under a multi pass bases in layers rather than apply the total amount at one time.

Soil should be allowed to dry back as necessary to allow compaction equipment to gain access to the stabilized soil. It is not necessary to blade off stabilized soil into windrows or berms. Final compaction can best be obtained with wheeled rubber tire roller or a vibratory compactor. Care as always should be used not to over vibrate in order to reduce cracking. Heavy equipment should be restricted from surface until a reasonable amount of cure has set in. Problem areas should be hand racked or portable mixed into soil that occur after installation. It also is recommended that core testing under standard procedures (ASTM) should be done to check specification and prior laboratory results.

An ideal distribution of particle size in a road material from coarse aggregate down to fine binding soil would be as follows:

| | % Passing |
|---|---|
| 1 inch sieve | 100 |
| ¾ inch sieve | 70 – 100 |
| ⅜ inch sieve | 58 – 80 |
| No. 4 sieve | 35 – 65 |
| No. 10 sieve | 25 – 50 |
| No. 40 sieve | 15 – 35 |
| No. 200 sieve | 5 – 20 |

The sample soil shown above will give the best results, but good roads can be obtained with a wide variety of soil types and particle size distributions. Since soils are usually complex mixtures, a soil test engineer can help find the right treatment for the particular soil. This may involve the addition of clay to sand to gravelly soils, and the addition of sand and gravel to clay soils to get the best and most economical results. The closer the road materials approach the ideal, the less of the present invention required and the longer the treated road surface will last. In most cases, the cost of the applied additive will determine whether or not you should modify the soil composition. In extreme cases, however, the soil composition must be modified to even make the road serviceable, regardless of whether the additive is used or not.

If there is a high water content in the soil, another ingredient which can be added to the additive, is sodium silicate which acts as a catalyst to absorb water and dry the product in the soil. Too much sodium silicate will result in cracking. Usually 2 – 5% by weight of the sodium silicate can be added to the soil additive.

Additionally, a dye can be mixed with the additive to aid in application identification.

The present invention has a comparable cost to soil cement for installation and an additional savings in time and labor. For the test road of Example I, the estimated cost was 60 cents per square yard. A single pass stabilizer-mixer would have reduced the labor costs even more.

TABLE I

| STRENGTH OF ADDITIVE | SOIL (Kg) | WATER | ADDITIVE | WET DENSITY (Kg/m³) | MOISTURE CONTENT | DRY DENSITY | TEST AT (days) | STRENGTH PSI |
|---|---|---|---|---|---|---|---|---|
| 3% | 6 lbs. (2.7) | 279.8cc | 8.7cc | 119.4 pcf (1912.5) | 9.1% | 109.4 pcf (1752.5) | 15 | — |
| 6% | 6 lbs. (2.7) | 271.2cc | 17.3cc | 120.0 pcf (1922.2) | 9.4% | 109.7 pcf (1757.2) | 15 | 690 (48.5) |
| 9% | 6 lbs. (2.7) | 262.5cc | 26.0cc | 119.7 pcf (1917.4) | 9.1% | 109.7 pcf (1757.2) | 15 | 840 (59.1) |
| 12% | 6 lbs. (2.7) | 253.9cc | 34.6cc | 118.8 pcf (1902.9) | 8.4% | 109.6 pcf (1755.6) | 15 | 970 (68.2) |

( ) Values Expressed by the Metric System.

TABLE II

| NO. | HEIGHT IN. | HEIGHT CM. | SPECIFIC GRAVITY | UNIT WEIGHT PCF | UNIT WEIGHT Kg/m$^3$ | STABILITY, TOTAL LOAD LBS. | STABILITY, TOTAL LOAD Kg. |
|---|---|---|---|---|---|---|---|
| 1. | 2.6 | (6.6) | 2.321 | 144.8 | (2319.4) | 4220 | (1914) |
| 2. | 2.5 | (6.4) | 2.320 | 144.8 | (2319.4) | 4480 | (2032) |
| 3. | 2.6 | (6.6) | 2.321 | 144.8 | (2319.4) | 5100 | (2313) |
| 4. | 2.6 | (6.6) | 2.322 | 144.9 | (2321.0) | 4870 | (2209) |
| 5. | 2.6 | (6.6) | 2.313 | 144.4 | (2313.0) | 4080 | (1851) |
| 6. | 2.6 | (6.6) | 2.259 | 141.0 | (2258.5) | 4150 | (1882) |

TABLE III

| NO. | HEIGHT IN. | HEIGHT CM | SPECIFIC GRAVITY | UNIT WEIGHT PCF | UNIT WEIGHT Kg/m$^3$ | STABILITY, TOTAL LOAD LBS. | STABILITY, TOTAL LOAD (Kg) |
|---|---|---|---|---|---|---|---|
| 1. | 2.5 | (6.4) | 2.189 | 136.6 | (2188) | 11,200 (dry) | (5080) |
| 2. | 2.5 | (6.4) | 2.240 | 139.8 | (2239) | 6,200 * | (2812) |

* Note: Sample No. 2 was soaked in water for 72 hours. Compression tests for both specimens were performed by using Marshall apparatus.
( ) Values expressed by the Metric System.

What is claimed is:
1. An additive for stabilizing in situ water permeable soil comprising from 80 – 90% by weight of a composition comprising vinyl acetate homopolymer, hydroxethyl cellulose, a non-ionic ethoxylated surfactant, potassium persulfate, sodium bicarbonate and water; from 5 – 10% by weight of a polyvinyl alcohol mixture comprising water, hydrogen peroxide, glycerin and polyvinyl alcohol; and from 5 – 10% by weight of a water repellent emulsion comprising wax, an ethoxylated surfactant, diglycol stearate, stearic acid, zirconium acetate, ethylene urea resin and water.

* * * * *